United States Patent
Wang et al.

(10) Patent No.: US 11,300,973 B2
(45) Date of Patent: Apr. 12, 2022

(54) CONTROL METHOD AND SYSTEM OF MOVABLE DEVICE

(71) Applicant: Beijing Jingdong Qianshi Technology Co., Ltd., Beijing (CN)

(72) Inventors: Shenjiao Wang, Beijing (CN); Chunpeng Shang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 133 days.

(21) Appl. No.: 16/472,094

(22) PCT Filed: Sep. 30, 2017

(86) PCT No.: PCT/CN2017/104768
§ 371 (c)(1),
(2) Date: Jun. 20, 2019

(87) PCT Pub. No.: WO2018/113385
PCT Pub. Date: Jun. 28, 2018

(65) Prior Publication Data
US 2020/0097020 A1  Mar. 26, 2020

(30) Foreign Application Priority Data

Dec. 22, 2016  (CN) .......................... 201611204337.X (51) Int. Cl.
  *G05D 1/02*  (2020.01)
(52) U.S. Cl.
  CPC ... *G05D 1/0246* (2013.01); *G05D 2201/0216* (2013.01)
(58) Field of Classification Search
  CPC .. G05D 1/0227; G05D 1/0272; G05D 1/0891; B62D 37/04; B60W 30/02;
  (Continued)

(56) References Cited

U.S. PATENT DOCUMENTS 5,746,282 A * 5/1998 Fujiwara ............. B60L 15/2009
                                                          180/6.2
5,947,225 A * 9/1999 Kawakami ........... G05D 1/0272
                                                          180/271
(Continued)

FOREIGN PATENT DOCUMENTS

CN  102854878  1/2013
CN  105479460  4/2016
(Continued)

OTHER PUBLICATIONS

International Search Report, issued in the corresponding PCT application No. PCT/CN2017/104768, dated Dec. 29, 2017, 6 pages.
(Continued)

*Primary Examiner* — Alexander G Kalinowski
*Assistant Examiner* — Sanjeev Malhotra
(74) *Attorney, Agent, or Firm* — Hamre, Schumann, Mueller & Larson, P.C.

(57) ABSTRACT

The present disclosure disclosed a control method of a movable device for controlling movement of the movable device between a first position and a second position, including: determining a position of a center of the movable device, a distance from the center to a left wheel of the movable device being equal to a distance from the center to a right wheel of the movable device; determining a traveling path of the movable device according to the position of the center of the movable device, the first position, and the second position; determining a difference between speeds of the left and right wheels and a center speed of the movable device according to the traveling path, the center speed, and geometric data of the movable device, the center speed being a speed of movement of the center of the movable device; determining the speeds of the left and right wheels of the movable device according to the difference; and controlling
(Continued)

the movement of the movable device according to the speeds of the left and right wheels.

18 Claims, 2 Drawing Sheets

(58) Field of Classification Search
CPC .... B60W 30/12; B60T 2201/08; Y02T 10/64; Y02T 10/72; A47B 53/02
USPC ........ 701/42, 70, 28; 700/112, 259; 180/6.2, 180/167, 218, 411; 414/281; 211/1.57; 52/27.5; 280/6.15; 320/107; 455/234.1; 435/4
See application file for complete search history.

(56) References Cited

U.S. PATENT DOCUMENTS

| | | | |
|---|---|---|---|
| 9,126,338 B2 | 9/2015 | Lee et al. | |
| 2002/0131849 A1* | 9/2002 | Hatanaka | A47B 53/02 414/281 |
| 2004/0187395 A1* | 9/2004 | Miyazaki | A47B 53/02 52/27.5 |
| 2007/0148632 A1* | 6/2007 | Kurnik | G06K 9/00503 435/4 |
| 2008/0290618 A1* | 11/2008 | Yanaka | B60G 17/0195 280/6.15 |
| 2009/0178862 A1* | 7/2009 | Greenwood | B62D 11/006 180/6.2 |
| 2009/0178876 A1* | 7/2009 | Miki | B62D 7/142 180/411 |
| 2010/0030430 A1* | 2/2010 | Hayakawa | B60W 30/08 701/42 |
| 2010/0219011 A1* | 9/2010 | Shimoyama | B62D 37/04 180/218 |
| 2012/0006765 A1* | 1/2012 | Tsujimoto | B65G 1/10 211/1.57 |
| 2014/0052296 A1* | 2/2014 | Lee | G05D 1/024 700/259 |
| 2014/0156052 A1* | 6/2014 | Nishibashi | G05B 19/4103 700/112 |
| 2015/0134218 A1* | 5/2015 | Ishida | B60W 30/12 701/70 |
| 2015/0171651 A1* | 6/2015 | Ding | H02J 7/007 320/107 |
| 2015/0207529 A1* | 7/2015 | Gander | H03M 1/185 455/234.1 |
| 2016/0132059 A1* | 5/2016 | Mason | G05D 1/0234 701/28 |
| 2016/0274588 A1 | 9/2016 | Tanaka | |
| 2017/0241759 A1* | 8/2017 | Werner | B23Q 17/22 |
| 2017/0280621 A1* | 10/2017 | Kawai | B62D 11/001 |
| 2017/0326996 A1* | 11/2017 | Kotani | B60L 53/50 |
| 2017/0357270 A1* | 12/2017 | Russell | G05D 1/0242 |
| 2019/0185269 A1* | 6/2019 | Baer | B65G 13/075 |
| 2019/0233027 A1* | 8/2019 | Yamamoto | G01C 21/34 |

FOREIGN PATENT DOCUMENTS

| | | |
|---|---|---|
| CN | 105892493 | 8/2016 |
| CN | 105957182 | 9/2016 |
| CN | 106896811 | 6/2017 |

OTHER PUBLICATIONS

Written Opinion, issued in the corresponding PCT application No. PCT/CN2017/104768, dated Dec. 29, 2017, 9 pages.
First Office Action, issued in the corresponding Chinese Patent application No. 201611204337.X, dated Dec. 28, 2017, 11 pages.
Indonesian Office Action, issued in the corresponding Indonesian patent application No. P00201905178, dated Jul. 9, 2021, 4 pages.
Indian Office Action, issued in the corresponding Indian patent application No. 201917024753, dated Dec. 21, 2021, 6 pages.

* cited by examiner

CONTROL METHOD AND SYSTEM OF MOVABLE DEVICE

TECHNICAL FIELD

The present disclosure relates to the field of computers, and in particular, to a control method and system of a movable device.

BACKGROUND

The transport robot does not have a human-like sensory organ. In a warehouse full of shelves, accurate navigation control of the transport robot is required to avoid accidents such as collisions. Traditionally, magnetic strips can be used for continuous navigation in the navigation control of the transport robot, so as to keep the transport robot from deviating from the established orbit. The positions where the magnetic strips are arranged define the path of the transport robot. Although this method is simple and easy to apply, once the layout of the warehouse is changed and the path is expected to be changed, the workload will be very large, which makes the application of this method very limited.

SUMMARY

An aspect of the present disclosure provides a control method of a movable device for controlling movement of the movable device between a first position and a second position, including: determining a position of a center of the movable device, a distance from the center to a left wheel of the movable device being equal to a distance from the center to a right wheel of the movable device; determining a traveling path of the movable device according to the position of the center of the movable device, the first position, and the second position; determining a difference between speeds of the left and right wheels and a center speed of the movable device according to the traveling path, the center speed, and geometric data of the movable device, the center speed being a speed of movement of the center of the movable device; determining the speeds of the left and right wheels of the movable device according to the difference between the speeds of the left and right wheels and the center speed; and controlling the movement of the movable device according to the speeds of the left and right wheels.

Another aspect of the present disclosure provides a control system of a movable device for controlling movement of the movable device between a first position and a second position, including: a processor; and a memory having executable instructions stored thereon, the executable instructions, when executed by the processor, cause the processor to: determine a position of a center of the movable device, a distance from the center to a left wheel of the movable device being equal to a distance from the center to a right wheel of the movable device; determine a traveling path of the movable device according to the position of the center of the movable device, the first position, and the second position; determine a difference between speeds of the left and right wheels and a center speed of the movable device according to the traveling path, the center speed, and geometric data of the movable device, the center speed being a speed of movement of the center of the movable device; determine the speeds of the left and right wheels of the movable device according to the difference between the speeds of the left and right wheels and the center speed; and control the movement of the movable device according to the speeds of the left and right wheels.

Another aspect of the present disclosure provided a control system of a movable device for controlling movement of the movable device between a first position and a second position, including: a center determination module, configured to determine a position of a center of the movable device, a distance from the center to a left wheel of the movable device being equal to a distance from the center to a right wheel of the movable device; a path determination module, configured to determine a traveling path of the movable device according to the position of the center of the movable device, the first position, and the second position; a speed difference determination module, configured to determine a difference between speeds of the left and right wheels and a center speed of the movable device according to the traveling path, the center speed, and geometric data of the movable device, the center speed being a speed of movement of the center of the movable device; a left and right wheel speed determination module, configured to determine the speeds of the left and right wheels of the movable device according to the difference between the speeds of the left and right wheels and the center speed; and a motion control module, configured to control the motion of the movable device according to the speeds of the left and right wheels.

Another aspect of the present disclosure provides a computer readable storage medium having stored thereon instructions for performing a method comprising: determining a position of a center of the movable device, a distance from the center to a left wheel of the movable device being equal to a distance from the center to a right wheel of the movable device; determining a traveling path of the movable device according to the position of the center of the movable device, the first position, and the second position; determining a difference between speeds of the left and right wheels and a center speed of the movable device according to the traveling path, the center speed, and geometric data of the movable device, the center speed being a speed of movement of the center of the movable device; determining the speeds of the left and right wheels of the movable device according to the difference between the speeds of the left and right wheels and the center speed; and controlling the movement of the movable device according to the speeds of the left and right wheels.

DETAILED DESCRIPTION

Other aspects, advantages, and outstanding features of the present disclosure will become obvious to those skilled in the art according to the following detailed description of the exemplary embodiment of the present disclosure in conjunction with the drawings.

In the present disclosure, the terms "include" and "comprise" and their derivatives are intended to be inclusive and not limiting; the term "or" is inclusive, meaning and/or.

In the present specification, the following various embodiments for describing the principles of the present disclosure are merely illustrative and should not be construed as limiting the scope of the present disclosure. The following description with reference to the drawings is used to facilitate a comprehensive understanding of the exemplary embodiments of the present disclosure defined by the claims and their equivalents. The following description includes numerous specific details to assist the understanding, but these details should be considered as merely exemplary. Accordingly, it will be apparent to those skilled in the art that various changes and modifications may be made to the embodiments described herein without departing from the scope and spirit of the disclosure. In addition, descriptions of well-known functions and constructions are omitted for clarity and conciseness. In addition, the same reference numbers are used for similar functions and operations throughout the drawings.

Several block diagrams and/or flow charts are shown in the drawings. It should be understood that some of the blocks or combinations thereof in the block diagrams and/or flow charts may be implemented by computer program instructions. Such computer program instructions may be provided to a processor of a general purpose computer, a special purpose computer, or other programmable data processing apparatuses such that the instructions, when executed by the processor, may create means for implementing the functions/operations illustrated in these block diagrams and/or flow charts.

Accordingly, the techniques of the present disclosure may be implemented in the form of hardware and/or software (including firmware, microcode, and the like). Additionally, the techniques of the present disclosure may take the form of a computer program product on a computer readable medium having stored thereon instructions for use by an instruction execution system. In the context of the present disclosure, a computer readable medium may be any medium that can contain, store, communicate, propagate, or transport the instructions. For example, computer readable medium may include but are not limited to electrical, magnetic, optical, electromagnetic, infrared, or semiconductor systems, apparatuses, devices, or propagation medium. Specific examples of computer readable medium include a magnetic storage device such as a magnetic tape or a hard disk (HDD), an optical storage device such as a compact disc (CD-ROM), a memory such as a random access memory (RAM) or a flash memory, and/or wired/wireless communication link.

Figure 1:
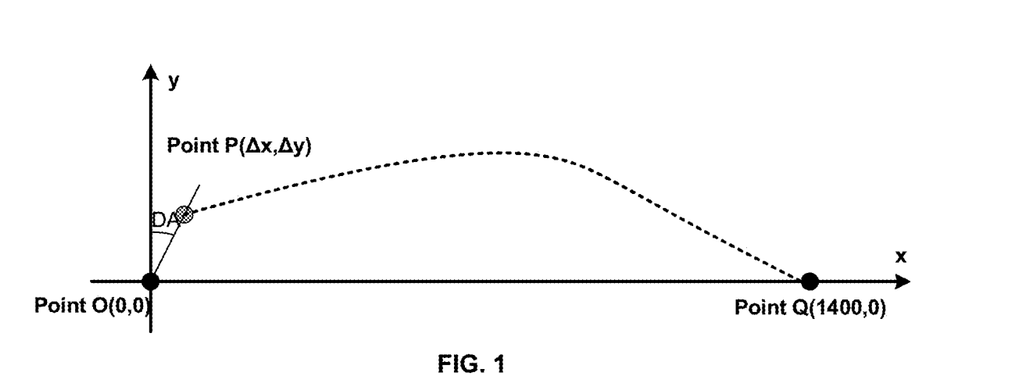
FIG. 1 schematically shows a schematic diagram of the principle of traveling of a movable device according to an embodiment of the present disclosure.

FIG. 1 schematically shows a schematic diagram of the principle of traveling of a movable device according to an embodiment of the present disclosure. According to an embodiment of the present disclosure, the movable device may be a robot or an autonomous vehicle. The robot may be, for example, a transport robot used in a warehouse.

As shown in FIG. 1, point O represents a first known position, point Q represents a second known position, and point P represents the current position of the center of the movable device. The movable device may be a robot or an autonomous vehicle, but is not limited thereto. According to an embodiment of the present disclosure, the movable device may include at least a left wheel and a right wheel, the center of the movable device being a point having equal distances to the left wheel and to the right wheel. The center of the movable device may be located on the movable device or outside the movable device. For example, in accordance with an embodiment of the present disclosure, the center of the movable device may be a point below the movable device on the motion plane of the movable device (for example, the ground). According to an embodiment of the present disclosure, the center of the movable device may be the midpoint of a connection of the contact points between the left and right wheels and the ground. According to the method described below, a traveling path from point P to point Q is calculated for controlling the center of the movable device to move from point P to point Q.

According to an embodiment of the present disclosure, the line connecting any two of the center of the movable device, the point O, and the point Q is parallel to the motion plane of the movable device. Hereinafter, for convenience of explanation, it is assumed that the center of the movable device, the point O, and the point Q are points on the motion plane of the movable device (for example, the ground).

As shown in FIG. 1, the point O is taken as the origin of the coordinate system, the line connecting the point O and the point Q is taken as the horizontal axis (x-axis); the axis passing through the origin and perpendicular to the horizontal axis is taken as the vertical axis (y-axis), and the curve represents the calculated traveling path of the movable device.

According to an embodiment of the present disclosure, the offset of the point P relative to the point O is first determined to determine the position of the point P according to the point O the position of which is known. For example, an image of a picture arranged at the point O may be acquired by an image acquisition unit (for example, a camera) on the movable device, and the offset of the point P relative to the point O may be determined according to the image. According to an embodiment of the present disclosure, different pictures, such as different two-dimensional code pictures, may be arranged at different positions. The picture may be designed such that when the position of the point P is different with respect to the point O, the obtained image is also different. In this way, the offset may be determined from different images. For example, various offset states may be traversed in advance to form a mapping table between the offset and the image, and then the offset corresponding to the acquired image may be determined by looking up the mapping table. Alternatively, an image where the relative position of the point P and the point O is known (for example, an image where the point P coincides with the point O) may be first acquired as a reference image, and an image acquired later in real time may be compared with the reference image, and then the current offset may be calculated according to the geometric data of the removable device. According to an embodiment of the present disclosure, the offset of the point P relative to the point O may be expressed by coordinates (Δx, Δy) in the coordinate system shown in FIG. 1, and the angle between the line connecting the point O and the point P and the y-axis is ΔA=arctan (Δx/Δy).

After determining the position of the point P, a curve may be fitted between the point P and the point Q as the traveling path of the movable device. The traveling path is a traveling path of the center point of the movable device. Then, the speeds of the left and right wheels of the movable device are controlled according to the traveling path, the moving speed of the center of the movable device, and the geometric data of the movable device, thereby controlling the movement of the movable device.

Figure 2:
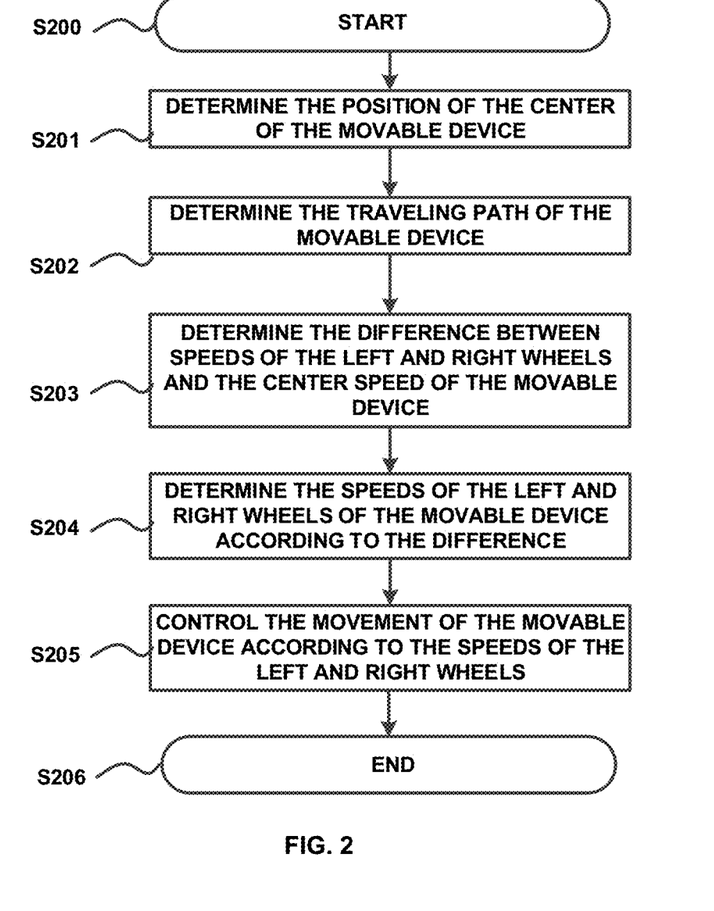
FIG. 2 schematically shows a flow chart of a control method of a movable device according to an embodiment of the present disclosure.

FIG. 2 schematically shows a flow chart of a control method of a movable device according to an embodiment of the present disclosure. As described above, the movable device may be a robot or an autonomous vehicle, and the robot of this embodiment is a transport robot, but not limited thereto. According to this embodiment, the movement of the movable device between the first position and the second position is controlled.

The method begins at step S200.

At step S201, the position of the center of the transport robot is determined, the distance from the center to the left wheel of the movable device being equal to the distance from the center to the right wheel of the movable device. For example, the center of the transport robot may be any one of the following: located on the transport robot; outside the transport robot; located on the motion plane of the transport robot (for example, the ground); or the midpoint of the connection of the contact points between the left and right wheels of the transport robot and the ground. Hereinafter, for convenience of description, it is assumed that the center of the transport robot is the midpoint of the connection of the contact points between the left and right wheels of the transport robot and the ground.

According to an embodiment of the present disclosure, the position of the center point of the transport robot may be determined by scanning a two-dimensional code picture arranged on the ground by a camera provided on the transport robot. For example, an array of two-dimensional code pictures may be arranged on the ground, each two-dimensional code picture being different from each other and its position being known. Thus, when the camera scans a two-dimensional code picture located at, for example, the point O which is the first position, it can be known that it is located near the point O by recognizing the two-dimensional code. Further, the offset of the current point P of the center of the transport robot relative to the point O may be obtained using the image of the scanned two-dimensional code picture according to the method described above with reference to FIG. 1.

At step S202, the traveling path of the transport robot is determined. Referring to FIG. 1, it is assumed that the transport robot is to move from the point P to the second known point Q.

The coordinate system is established with the point O as the origin of the coordinate system, the line connecting the point O and the point Q as the horizontal axis (x-axis), and the axis passing through the origin and perpendicular to the horizontal axis as the vertical axis (y axis). Then, according to the offset of the point P relative to the point O determined at step S201, the coordinates (Δx, Δy) of the point P in the coordinate system, and the angle between the line connecting the point O and the point P and the y-axis ΔA=arctan (Δx/Δy) may be determined. It is known that the distance between the point Q and the point O is s, and therefore, the coordinates of the point Q are (s, 0). In the present embodiment, s=1400, so the coordinates of the point Q are (1400, 0), as shown in FIG. 1.

Then, a curve fitting may be performed between the point P and the point Q, and the obtained curve is the traveling path. The interpolation algorithm may be a cubic Hermite interpolation algorithm, as shown in the following formula (1):

$$H_3(x) = \Delta y \times \left(1 + 2\frac{x-\Delta x}{\Delta s - \Delta x}\right)\left(\frac{x-\Delta s}{\Delta x - \Delta s}\right)^2 + \left(\tan(\Delta A) \times (x-\Delta x)\left(\frac{x-\Delta s}{\Delta x - \Delta s}\right)^2\right) \quad (1)$$

Wherein, $H_3(x)$ is the traveling path of the center of the transport robot.

According to an embodiment of the present disclosure, other interpolation algorithms may also be used to perform the above curve fitting, such as the Lagrange interpolation algorithm, the Newton interpolation algorithm or the piecewise interpolation algorithm.

At step S203, a difference between the speeds of the left and right wheels and the speed of the center of the body of the transport robot is determined.

The traveling path of the center of the transport robot is calculated above. In order to move the transport robot along the traveling path, it is necessary to calculate the difference between the speeds of the left and right wheels and the speed of the center of the body of the transport robot, and determine the speeds of the left and right wheels of the transport robot, so as to control the movement of the left and right wheels.

According to the embodiment of the present disclosure, the traveling path determined at step S202 may be divided into a plurality of arcs, and the rotation radius cycleR0 when the center of the transport robot passes through each arc may be calculated. According to the rotation radius cycleR0, the speed fCurVel of the center of the body of the transport robot, and the left and right wheel spacing vehicleRadius of the transport robot, the difference fDiffVel between the speeds of the left and right wheels and the speed of the center of the body of the transport robot when the center of the body of the transport robot passes through each arc may be determined, as shown in the following formula (2):

$$fDiffVel = fCurVel \times vehicleRadus \div cycleR0 \quad (2)$$

According to the embodiment of the present disclosure, the abscissa xNew of the center of the transport robot may be calculated every time period t according to the following formula (3).

$$xNew = fCurVel \times t + xOld \quad (3)$$

In the formula, fCurVel is the speed of the center of the transport robot during the time period t, and xOld is the abscissa calculated last time. When the center of the transport robot is at the point P, xOld=x. It can be seen that the calculation of xNew is an iterative process with x as the initial value, and xOld used in each calculation is xNew calculated last time. Here, fCurVel is used to approximate the speed of the center of the transport robot in the x-axis direction. It can be understood that t may be a fixed value set in advance, but the present disclosure is not limited thereto.

Substituting the values of xOld and xNew above into the formula (1) yields the values of the corresponding $H_3$(xOld) and $H_3$(xNew) as yOld and yNew, respectively. It is also possible to obtain the derivative values hyOld and hyNew of $H_3(x)$ at xOld and xNew.

Next, according to the following formula (4), the rotation radius cycleR0 of the center of the transport robot when it passes through an arc in the time period t is calculated:

$$cycleR0 = \frac{\sqrt{(yNew - yOld)^2 + (xNew - xOld)^2}}{2 \times \sin\left(\frac{\arctan(hyOld) - \arctan(hyNew)}{2}\right)} \quad (4)$$

Then, according to the formula (2), the difference fDiffVel between the speeds of the left and right wheels and the speed of the center of the body of the transport robot when the center of the body of the transport robot passes through the arc may be determined.

At step S204, the speed VL of the left wheel and the speed VR of the right wheel of the transport robot are determined according to the speed fCurVel of the center of the body of the transport robot and the difference fDiffVel, as shown in the following formula (5):

$$V_L = fCurVel + fDiffVel$$

$$V_R = fCurVel - fDiffVel \quad (5).$$

At step S205, the movement of the transport robot may be controlled according to the speeds of the left and right wheel, that is, a blind traveling between the first and second known positions may be performed correctly without the guidance of navigation information.

The method ends at step S206.

According to an embodiment of the present disclosure, an array of two-dimensional code pictures may be arranged on the ground. By pre-designing the route, a sequence of two-dimensional code pictures to be passed by the movable device may be determined. Then, according to the above method, the movable device may be controlled to move through the two-dimensional code sequence, so as to realize navigation of the movable device. When the route is to be changed, it is only necessary to change the two-dimensional code sequence accordingly, without having to re-lay the hardware on the ground, which significantly reduces the operating and maintenance costs of the system, and greatly facilitates the operation and use of the system.

Figure 3:
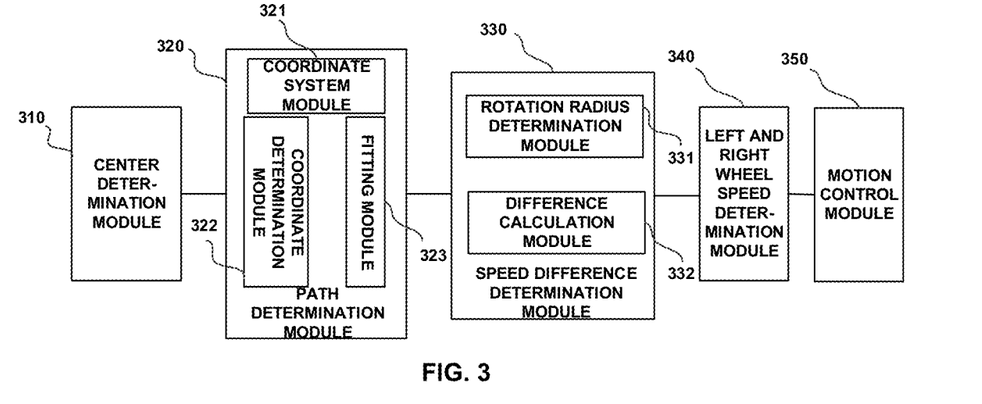
FIG. 3 schematically shows a block diagram of a control system of a movable device according to an embodiment of the present disclosure.

FIG. 3 schematically illustrates a block diagram of a control system 300 of a movable device according to an embodiment of the present disclosure. As described above, the movable device may be a robot or an autonomous vehicle, and the robot of this embodiment is a transport robot, but not limited thereto. According to this embodiment, the control system 300 controls the movement of the movable device between the first position and the second position.

The system 300 includes a center determination module 310, a path determination module 320, a speed difference determination module 330, a left and right wheel speed determination module 340, and a motion control module 350.

The center determination module 310 determines the position of the center of the transport robot, the distance from the center to the left wheel of the movable device being equal to the distance from the center to the right wheel of the movable device. For example, the center of the transport robot may be any one of the following: located on the transport robot; located outside the transport robot; located on the motion plane of the transport robot (for example, the ground); or the midpoint of the connection of the contact points between the left and right wheels of the transport robot and the ground. Hereinafter, for convenience of description, it is assumed that the center of the transport robot is the midpoint of the connection of the contact points between the left and right wheels of the transport robot and the ground.

According to an embodiment of the present disclosure, the position of the center point of the transport robot may be determined by scanning a two-dimensional code picture arranged on the ground by a camera provided on the transport robot. For example, an array of two-dimensional code pictures may be arranged on the ground, each two-dimensional code picture being different from each other and its position being known. Thus, when the camera scans a two-dimensional code picture located at, for example, the point O which is the first position, it can be known that it is located near the point O by recognizing the two-dimensional code. Further, the offset of the current point P of the center of the transport robot relative to the point O may be obtained using the image of the scanned two-dimensional code picture according to the method described above with reference to FIG. 1.

The path determination module 320 determines the traveling path of the transport robot. Referring to FIG. 1, it is assumed that the transport robot is to move from the point P to the second known point Q.

According to an embodiment of the present disclosure, the module may include a coordinate system module 321, a coordinate determination module 322, and a fitting module 323.

The coordinate system module 321 establishes a coordinate system based on the point O and the point Q. Specifically, the coordinate system module 321 establishes a coordinate system with the point O as the origin of the coordinate system, the line connecting the point O and the point Q as the horizontal axis (x-axis), and the axis passing through the origin and perpendicular to the horizontal axis as the vertical axis (y axis).

The coordinate determination module 322 determines the coordinates of the point P and the point Q in the above coordinate system. Specifically, the coordinate determination module 322 determines the coordinates ($\Delta x$, $\Delta y$) of the point P in the coordinate system, and the angle between the line connecting the point O and the point P and the y-axis $\Delta A = \arctan(\Delta x / \Delta y)$, according to the offset of the point P relative to the point O determined by the center determination module 310. It is known that the distance between the point Q and the point O is s, and therefore, the coordinates of the point Q are (s, 0). In the present embodiment, s=1400, so the coordinates of the point Q are (1400, 0), as shown in FIG. 1.

The fitting module 323 uses an interpolation algorithm to fit a curve between the position of the point P and the position of the point Q, and the obtained curve is the above-mentioned traveling path. Specifically, the fitting module 323 may fit a curve between the point P and the point Q according to the coordinates of the point P and the point Q obtained by the coordinate determination module 322, and the obtained curve is the traveling path. The interpolation algorithm may be a cubic Hermite interpolation algorithm, as shown in the above formula (1), and the calculated $H_3(x)$ is the traveling path of the center of the transport robot.

According to an embodiment of the present disclosure, other interpolation algorithms may also be used to perform the above curve fitting, such as Lagrange interpolation algorithm, Newton interpolation algorithm or piecewise interpolation algorithm.

The speed difference determination module 330 determines the difference between the speeds of the left and right wheels and the speed of the center of the body of the transport robot.

The traveling path of the center of the transport robot is calculated above. In order to move the transport robot along the traveling path, it is necessary to calculate the difference between the speeds of the left and right wheels and the speed of the center of the body of the transport robot, so as to control the movement of the left and right wheels.

According to an embodiment of the disclosure, the speed difference determination module 330 may include a rotation radius determination module 331 and a difference calculation module 332.

The rotation radius determination module 331 determines the rotation radius of the center of the transport robot when it passes through an arc in the above-mentioned traveling path. Specifically, the rotation radius determination module 331 may divide the traveling path determined by the path determination module 320 into a plurality of arcs, and calculate a rotation radius cycleR0 of the center of the transport robot when it passes through each arc.

According to an embodiment of the present disclosure, the abscissa xNew of the center of the transport robot may be calculated every time period t according to the above formula (3). In the formula, fCurVel is the speed of the center of the transport robot during the time period t, and xOld is the abscissa calculated last time. When the center of the transport robot is at the point P, xOld=x. It can be seen that the calculation of xNew is an iterative process with x as the initial value, and xOld used in each calculation is xNew calculated last time. Here, fCurVel is used to approximate the speed of the center of the transport robot in the x-axis direction. It can be understood that t may be a fixed value set in advance, but the present disclosure is not limited thereto.

Substituting the values of xOld and xNew above into the formula (1) yields the values of the corresponding $H_3(xOld)$ and $H_3(xNew)$ as yOld and yNew, respectively. It is also possible to obtain the derivative values hyOld and hyNew of $H_3(x)$ at xOld and xNew.

Next, according to the above formula (4), the rotation radius cycleR0 of the center of the transport robot when it passes through an arc in the time period t is calculated.

The difference calculation module 332 determines the difference between the speeds of the left and right wheels and the speed of the center of the body of the transport robot when the center of the transport robot passes through the arc, according to the speed of the center of the transport robot, the rotation radius of the arc, and the left and right wheel spacing of the transport robot. Specifically, according to the rotation radius cycleR0, the speed fCurVel of the center of the body of the transport robot, and the left and right wheel spacing vehicleRadius of the transport robot, the difference fDiffVel between the speeds of the left and right wheels and the speed of the center of the body when the center of the body of the transport robot passes through each arc may be determined, as shown in the above formula (2).

The left and right wheel speed determination module 340 determines the speeds of the left and right wheels of the transport robot according to the difference between the speeds of the left and right wheels and the speed of the center of the body of the transport robot, as shown in the above formula (5).

The motion control module 350 may control the motion of the transport robot according to the difference fDiffVel between the speeds of the left and right wheels and the speed of the center of the body of the transport robot, that is, a blind traveling between the known first position and second position may be performed correctly without the guidance of navigation information.

It can be understood that any of the center determination module 310, the path determination module 320, the coordinate system module 321, the coordinate determination module 322, the fitting module 323, the speed difference determination module 330, the rotation radius determination module 331, the difference calculation module 332, the left and right wheel speed determination module 340 and the motion control module 350 may be combined in one module, or any one of the modules may be split into a plurality of modules. Alternatively, at least some of the functionality of one or more of these modules may be combined with at least some of the functionality of the other modules and implemented in one module. According to an embodiment of the present disclosure, at least one of the center determination module 310, the path determination module 320, the coordinate system module 321, the coordinate determination module 322, the fitting module 323, the speed difference determination module 330, the rotation radius determination module 331, the difference calculation module 332, the left and right wheel speed determination module 340 and the motion control module 350 may be at least partially implemented as a hardware circuit, such as a field programmable gate array (FPGA), a programmable logic array (PLA), a system-on-chip, a system on substrate, a system on package, an application specific integrated circuit (ASIC), or may be implemented in any other reasonable manner of hardware or firmware that integrates or packages the circuits, or may be implemented in a suitable combination of three implementations of software, hardware, and firmware. Alternatively, at least one of the center determination module 310, the path determination module 320, the coordinate system module 321, the coordinate determination module 322, the fitting module 323, the speed difference determination module 330, the rotation radius determination module 331, the difference calculation module 332, the left and right wheel speed determination module 340 and the motion control module 350 may be implemented at least in part as a computer program module that, when executed by the computer, can perform the functions of the corresponding module.

Figure 4:
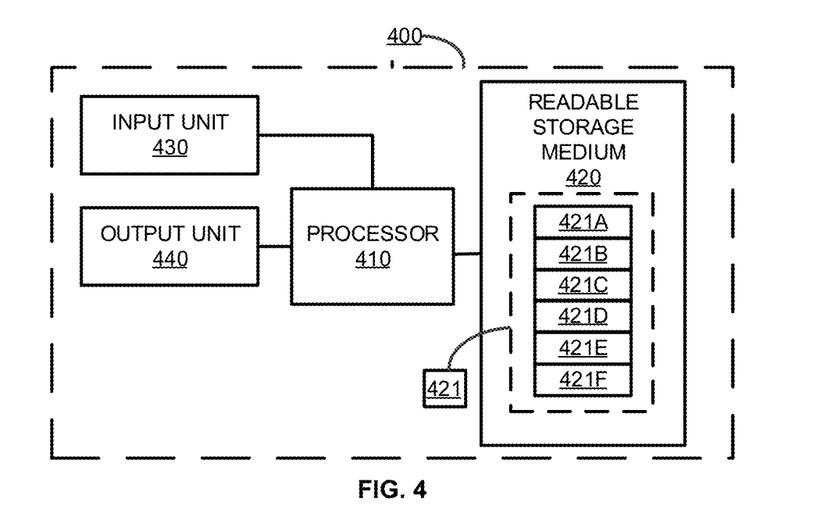
FIG. 4 schematically shows a block diagram of a control system of a movable device according to another embodiment of the present disclosure.

FIG. 4 schematically shows a block diagram of a control system 400 of a movable device according to another embodiment of the present disclosure. As shown, the control system 400 of the movable device includes a processor 410, such as a general purpose microprocessor, an instruction set processor, and/or a related chip-set and/or a special purpose microprocessor (for example, an application specific integrated circuit (ASIC)), and the like. The processor 410 may also include an on-board memory for cache usage. The processor 410 may be a single processing unit or a plurality of processing units for performing different actions of the method flow according to the embodiments of the present disclosure described with reference to FIG. 2.

The control system 400 of the removable device may also include at least one readable storage medium 420 in the form of a non-volatile or volatile memory, such as any medium that can contain, store, communicate, propagate, or transport the instructions. For example, the readable storage medium may include but is not limited to an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disc (CD-ROM); a memory such as a random access memory (RAM) or a flash memory; and/or a wired/wireless communication link.

The readable storage medium 420 includes a computer program 421 that includes codes/computer readable instructions that, when executed by the processor 410, cause the processor 410 to perform, for example, the method flow described above in connection with FIG. 2 and any variations thereof.

The computer program 421 may be configured with computer program codes, including, for example, computer program modules. For example, in an example embodiment, the codes in the computer program 421 may include one or more program modules, including, for example, module 421A, module 421B, . . . , module 421F. It should be noted that the division manner and number of modules are not fixed, and those skilled in the art may use suitable program modules or program module combinations according to actual conditions. These program module combinations, when executed by the processor 410, cause the processor 410 to perform the method flow described above in connection with FIG. 2 and any variations thereof.

According to an embodiment of the present disclosure, the control system 400 of the movable device may further include an input unit 430 for receiving signals from other entities, and an output unit 440 for providing signals to other entities. The input unit 430 and the output unit 440 may be arranged as a single entity or as separate entities. The input unit 430 may receive an image of a two-dimensional code picture transmitted by, for example, an image acquisition unit, and the output unit 440 may transmit a power control signal to the power control system of the movable device. The power control signal may be a signal that controls the left and right wheels based on the difference between the speeds of the left and right wheels and the speed of the center of the movable device. In this way, the movement of the movable device can be controlled.

Combined with FIG. 3 and FIG. 4, according to an embodiment of the present disclosure, the center determination module 310, the path determination module 320, the coordinate system module 321, the coordinate determination module 322, the fitting module 323, the speed difference determination module 330, the rotation radius determination module 331, the difference calculation module 332, the left and right wheel speed determination module 340 and the motion control module 350 may be implemented as the computer program modules described with reference to FIG. 4, which, when executed by the processor 410, can implement the corresponding operations described above.

Although the present disclosure has been shown and described with reference to specific exemplary embodiments thereof, it will be understood by those skilled in the art that various changes in form and detail may be made without departing from the spirit and scope of the disclosure, as defined by the appended claims and their equivalents. Therefore, the scope of the disclosure should not be limited to the above-described embodiments, but should be determined not only by the appended claims but also by equivalents of the appended claims.

We claim:

1. A control method of a movable device for controlling movement of the movable device between a first position and a second position to transport an object in a warehouse, comprising:

determining a position of a center of the movable device, a distance from the center to a left wheel of the movable device being equal to a distance from the center to a right wheel of the movable device, wherein the determining of the position of the center of the movable device comprises determining the position of the center of the movable device relative to the first position according to a two-dimensional code in an array of two-dimensional codes provided on a ground of the warehouse, which is arranged at the first position and acquired by an image acquisition unit on the movable device;

determining a traveling path of the movable device according to the position of the center of the movable device, the first position, and the second position;

determining a difference between speeds of the left and right wheels and a center speed of the movable device according to the traveling path, the center speed, and geometric data of the movable device, the center speed being a speed of movement of the center of the movable device;

determining speeds of the left and right wheels of the movable device according to the difference between the speeds of the left and right wheels and the center speed; and controlling the movement of the movable device along the traveling path according to the speeds of the left and right wheels, wherein the controlling of the movement of the movable device along the traveling path comprises determining a sequence of two-dimensional codes in the array of two-dimensional codes to be passed by the movable device, and controlling the movable device to move through the sequence of two-dimensional codes.

2. A method of claim 1, wherein the two-dimensional codes at different positions are different.

3. The method of claim 1, wherein:

a line connecting any two of the position of the center of the movable device, the first position and the second position is parallel to a motion plane of the movable device; and wherein determining the traveling path of the movable device according to the position of the center of the movable device, the first position, and the second position comprises:

establishing a coordinate system according to the first position and the second position;

determining coordinates of the position of the center and the second position in the coordinate system; and fitting a curve between the position of the center and the second position using an interpolation algorithm, the obtained curve being the traveling path.

4. The method of claim 3, wherein establishing a coordinate system according to the first position and the second position comprises:

taking the first position as an origin of the coordinate system;

taking a line connecting the first position and the second position as a horizontal axis; and taking an axis passing through the origin and perpendicular to the horizontal axis as a vertical axis.

5. The method of claim 3, wherein the interpolation algorithm comprises any one of the following: a cubic Hermite interpolation algorithm, a Lagrange interpolation algorithm, a Newton interpolation algorithm, or a piecewise interpolation algorithm.

6. The method of claim 1, wherein determining a difference between speeds of the left and right wheels and a center speed of the movable device according to the traveling path, the center speed, and geometric data of the movable device comprises:

determining a rotation radius of the center of the movable device when the center passes through an arc of the traveling path; and determining the difference between the speeds of the left and right wheels and the center speed when the center of the movable device passes through the arc, according to the center speed of the movable device, the rotation radius of the arc, and a left and right wheel spacing of the movable device.

7. The method of claim 6, wherein determining the rotation radius of the arc comprises:
   determining coordinates and derivatives of two endpoints of the arc; and
   determining the rotation radius of the arc according to the coordinates and derivatives of the two endpoints of the arc.

8. The method of claim 1, wherein the movable device comprises any one of a robot or an autonomous vehicle.

9. The method of claim 1, wherein the center of the movable device is any one of the following:
   located on the movable device;
   located outside of the movable device;
   located on a motion plane of the movable device; or
   a midpoint of a connection of contact points between the left and right wheels of the movable device and the ground.

10. A computer readable storage medium having stored thereon instructions for performing the method of claim 1.

11. A control system of a movable device for controlling movement of the movable device between a first position and a second position to transport an object in a warehouse, comprising:
   a processor; and
   a memory having executable instructions stored thereon, the executable instructions, when executed by the processor, cause the processor to:
      determine a position of a center of the movable device, a distance from the center to a left wheel of the movable device being equal to a distance from the center to a right wheel of the movable device, wherein the determining of the position of the center of the movable device comprises determining the position of the center of the movable device relative to the first position according to a two-dimensional code in an array of two-dimensional codes provided on a ground of the warehouse, which is arranged at the first position and acquired by an image acquisition unit on the movable device,
      determine a traveling path of the movable device according to the position of the center of the movable device, the first position, and the second position,
      determine a difference between speeds of the left and right wheels and a center speed of the movable device according to the traveling path, the center speed, and geometric data of the movable device, the center speed being a speed of movement of the center of the movable device,
      determine speeds of the left and right wheels of the movable device according to the difference between the speeds of the left and right wheels and the center speed, and
      control the movement of the movable device along the traveling path according to the speeds of the left and right wheels, wherein the controlling of the movement of the movable device along the traveling path comprises determining a sequence of two-dimensional codes in the array of two-dimensional codes to be passed by the movable device, and controlling the movable device to move through the sequence of two-dimensional codes.

12. A movable device comprising the control system of claim 11.

13. The control system of claim 11, wherein the two-dimensional codes at different positions are different.

14. The control system of claim 11, wherein
   a line connecting any two of the position of the center of the movable device, the first position and the second position is parallel to a motion plane of the movable device; and
   wherein the executable instruction, when executed by the processor, further cause the processor to:
   establish a coordinate system according to the first position and the second position;
   determine coordinates of the position of the center and the second position in the coordinate system; and
   fit a curve between the position of the center and the second position using an interpolation algorithm, the obtained curve being the traveling path.

15. The control system of claim 14, wherein the executable instruction, when executed by the processor, further cause the processor to:
   take the first position as an origin of the coordinate system;
   take a line connecting the first position and the second position as a horizontal axis; and
   take an axis passing through the origin and perpendicular to the horizontal axis as a vertical axis.

16. The control system of claim 14, wherein the interpolation algorithm comprises any one of the following: a cubic Hermite interpolation algorithm, a Lagrange interpolation algorithm, a Newton interpolation algorithm, or a piecewise interpolation algorithm.

17. The control system of claim 11, wherein the executable instruction, when executed by the processor, further cause the processor to:
   determine a rotation radius of the center of the movable device when the center passes through an arc of the traveling path; and
   determine a difference between the speeds of the left and right wheels and the center speed when the center of the movable device passes through the arc, according to the center speed of the movable device, the rotation radius of the arc, and a left and right wheel spacing of the movable device.

18. The control system of claim 17, wherein the executable instruction, when executed by the processor, further cause the processor to:
   determine coordinates and derivatives of two endpoints of the arc; and
   determine the rotation radius of the arc according to the coordinates and derivatives of the two endpoints of the arc.

* * * * *